Dec. 3, 1929.   J. B. HOLTSON   1,738,069
TANK FILL BOX
Filed Aug. 1, 1925
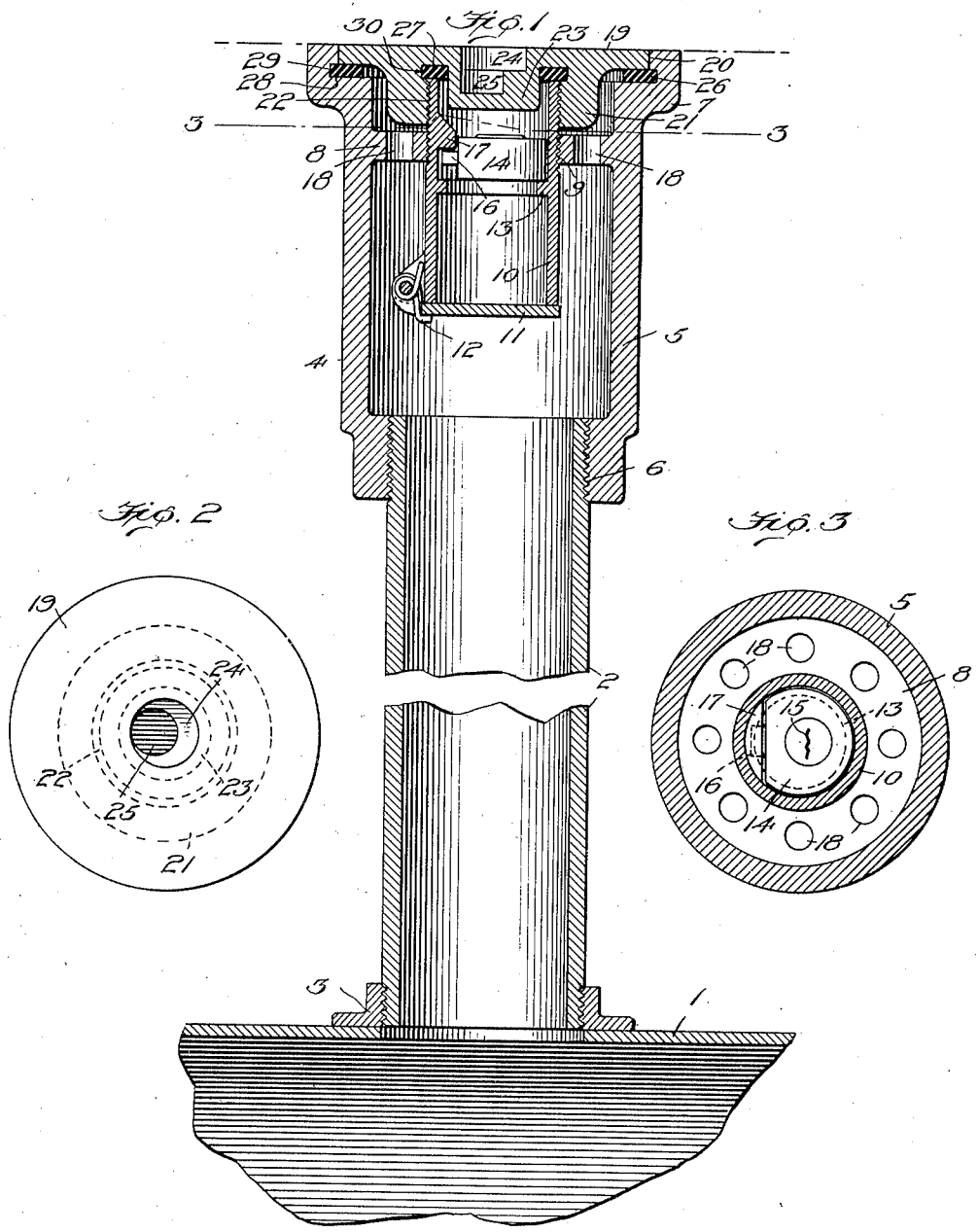
Inventor
James B. Holtson
By
his Attorney Patented Dec. 3, 1929

1,738,069

UNITED STATES PATENT OFFICE

JAMES B. HOLTSON, OF BALTIMORE, MARYLAND, ASSIGNOR TO HOLTSON MANUFACTURING CORPORATION, OF BALTIMORE, MARYLAND, A CORPORATION OF MARYLAND

TANK FILL BOX

Application filed August 1, 1925. Serial No. 47,649.

The invention relates to fill boxes for storage tanks such for instance as those used in storing gasoline at service stations and the like.

The principal object of the invention, generally stated, is to provide a simple and rugged fill box for gasoline tanks and the like, the fill box being intended to be located, as by embedding, in the ground or in a cement floor or driveway such as are found in or at motor vehicle service stations, garages, etc., the fill box being, moreover, of such construction as to be capable of withstanding the passage thereover of the wheels of trucks or other heavy vehicles, and embodying a filler tube enclosed and amply protected against damage and further including a removable cover which not only seals the filler tube for preventing escape of gases but which also acts to prevent the entrance of dirt, water or other foreign matter which might impair the quality of the product stored in the tank with which the device is associated.

An important object of the invention is to provide a fill box including a filler tube within which is normally disposed a displaceable locking device preventing insertion of a pump hose or the like for unauthorized withdrawal of the liquid contained in the tank, the filler tube being, moreover, equipped with a closure which will prevent the dropping of burning matches, cigarette stumps or the like into the tank by mischievous persons.

An object of the invention, more particularly stated, is the provision of a fill box carried by a pipe rising from the tank, the box being provided internally with an apertured web from which depends a filler tube so located as to define an annular space for the escape of air during filling, the apertures in the web being arranged in circular series about said tube.

A still further object of the invention is to provide a specific holding means for packing gaskets whereby they must be sprung into place so as to be retained against accidental displacement or removal with the cap in the event that they should adhere thereto.

An additional object of the invention is to provide the cap with a socket therein of such formation as to necessitate the use of a peculiar type of machine wrench for effecting unscrewing, it being consequently impossible, or at least extremely difficult, for a person to remove the cap by ordinary methods.

To the attainment of the foregoing and other objects and advantages such as simplicity, cheapness, ease of handling, prevention of contamination of the product by water, and compliance with numerous ordinances pertaining to gasoline or other liquid storage, the invention consists in the details of construction and the arrangement of parts to be hereinafter fully described and claimed, and illustrated in the accompanying drawings wherein is disclosed a preferred embodiment of the invention, it being, however, understood that changes and modifications may be made in the detailed structure provided such variations constitute no departure from the spirit of the invention or the scope of the claims hereunto appended.

In the drawings wherein like reference characters denote corresponding parts throughout the several views:

Figure 1 is a longitudinal or vertical section taken centrally through my fill box showing it connected with a tank and illustrating the closure plug in sealing position.

Figure 2 is a plan view of the cap.

Figure 3 is a horizontal section on the line 3—3 of Figure 1 showing the vent apertures and a plan of the lock.

Referring to the drawings in detail, the numeral 1 designates a conventional storage tank such as those of the underground type used for storing gasoline at service stations, garages, and the like, though naturally there is no restriction as to the particular tank, its location, or the liquid intended to be handled. Rising from this tank is a pipe 2 here represented as secured within a collar 3 on the tank. This pipe carries the fill box designated broadly by the numeral 4 and including a preferably cylindrical body 5, the lower end of which is formed with an opening 6 receiving the upper end of the pipe 2 and secured thereto in some suitable manner, as for instance by threading. The upper end of the body 5 is offset outwardly, as indicated at 7, and in actual practice is intended to be located at the ground line or at the surface of a floor or the like, though such a position is not an essential feature.

At a point spaced considerably down from its upper end, the body 5 is formed internally with a web 8 having a threaded opening 9 therein into which is screwed a filler tube 10 which has its end portions extending above and below the web 8. Any desired means such as a set screw 10ª may be provided for holding the tube against rotation when in final position. The lower end of the filler tube is normally closed by a pivoted door 11 urged into closed position by suitable means such as a spring 12, the door being provided for the purpose of preventing mischievous persons from dropping lighted matches, smoldering cigarette stumps or the like into the tank, as has been known to occur, and to prevent water from contaminating the product stored in the tank in case the cap is left off. The door will close automatically upon removal of the gage rod which is used to ascertain the quantity of liquid within the tank.

At a point intermediate its ends the filler tube 10 is formed with an internal flange 13 which forms a seat for a bodily removable lock device 14 which includes a suitable casing containing any ordinary or preferred type of lock mechanism releasable by means of a suitable key insertable through a key hole slot 15, the lock mechanism including a bolt 16 normally engaging beneath a lip 17. The type of lock is such that when the proper key is inserted and turned the lock may be lifted bodily out of the filler tube so as to permit liquid to pass therethrough into the tank. It is clear that when the lock is in place it will be impossible to insert a pump hose, siphon tube or the like for the purpose of withdrawing liquid, this feature making the device theft proof. The lock casing has one side flat and engaging against the edge of the lip so that the lock device cannot be rotated to disengage the bolt thereof from beneath the lip.

An important feature is the provision of means to permit the escape of air from the tank while it is being filled with liquid, and to accomplish this I preferably form the web 8 with a circular series of holes 18 located between the inside wall of the box 5 and the outer periphery of the filler tube 10, the size and number of holes being an immaterial detail. Owing to the fact that the filler tube terminates at a point above the pipe 2 and that it is of less diameter than the box itself, it is quite clear that a chamber of ample size is provided through which air displaced from the tank may pass and escape through the holes 18 into the atmosphere without bubbling up through the inflowing liquid.

For closing and sealing the device I provide a cap 19 of circular shape fitting within a recess 20 in the outwardly offset portion 7 of the box, the cap being formed on its underside with a depending flange 21 internally threaded at 22 and screwed onto the upper end of the filler tube 10. Inwardly of the flange 21 the cap is formed at its underside with a projection 23 having recesses 24 and 25 therein, both of which are preferably circular in shape and the latter of which is eccentric with respect to the former so as to necessitate the employment of a specific type of machine wrench for effecting unscrewing of the cap. This feature provides another safeguard against theft and unauthorized tampering with the box.

In order to exclude water and dirt from the box and to prevent the escape of any fumes, use is made of gaskets 26 and 27, the former of which is located upon a shoulder 28 with its outer portion engaged within a recess 29 in the inner wall of the outwardly offset upper portion 7 of the box. Owing to the provision of this recess it is obvious that the wall of the box overhangs the gasket 26, making it necessary that this gasket be sprung into place when applied. Substantially the same is true of the gasket 27 which is located between the projection 23 and the flange 21 with its outer periphery engaged within a recess 30. The gasket 26 is of course engaged by the underside of the outer portion of the cap 19 while the gasket 27 engages upon the upper end of the filler tube 10. The feature of providing the recesses into which the gaskets are sprung is of importance inasmuch as the gaskets will be positively retained in position and prevented from being displaced in case they should adhere to the cap, as might occur if the box were left closed for a considerable time.

In actual practice the box is ordinarily installed by embedding it in the ground or in cement with the upper end of the box flush with the surface. Very frequently boxes for this purpose are located in or near driveways or at other places where the wheels of vehicles may pass over them. Unless the box be of peculiar and strong construction there is considerable danger that it may be broken by passage of the wheels of heavy trucks over it. It will be observed that the body of the box is of heavy construction and that it is formed with an outward offset which will take the downward thrust resulting from passage of a vehicle wheel over the top, the threaded connection of the box with the pipe being therefore free from any great degree of strain. The cap 19 is likewise of heavy construction and as it seats upon the shoulder formed by recessing the upper end of the body it is capable of withstanding heavy loads without communicating excessive strains to its threaded connection with the filler tube 10. When screwed down properly, the cap fits tightly upon the upper end of the filler tube and is braced thereby in addition to forming a seal therefor. By having the cap screw upon the exterior of the filler tube instead of the interior it will be seen that the threads will not be damaged by the insertion of a funnel or hose discharge nozzle within the filler tube. The snug fit of the cap within the recess at the upper end of the body prevents entrance of dirt, water or other foreign matter and the efficiency in this respect is enhanced by the provision of the gasket 26. It has been stated above that the web 8 is "preferably" provided with the vent openings 18 for the escape of air as liquid is introduced through the filler tube, but in case such openings are not provided, as is well within the scope of the invention, the annular chamber defined between the outside of the filler tube and the wall of the body above the web would take care of and retain any foreign matter or water which might enter without danger of the same working its way into and through the filler tube.

A device constructed in accordance with my invention will be found highly advantageous and convenient in use inasmuch as the tank may be filled very rapidly without danger of blow backs and consequent loss of liquid. When the cap is screwed into place the box is effectually sealed so that there will be no loss from evaporation and no possibility of the entrance of water or other foreign matter. Furthermore, even though the cap be removed access to the tank for theft of liquid will be prevented by the locking mechanism. If the lock be removed dropping of articles of any kind into the tank is avoided by the provision of the closure door for the filler tube. This door does not in any way interfere with the filling operation as it is customary to insert a funnel into the filler tube, the funnel engaging and opening the door.

While I have shown and described a preferred embodiment of the invention, it should be understood that the disclosure is merely illustrative as it is quite conceivable that various changes may be made in the details of construction and I reserve the right to make all such modifications and changes as will widen the field of usefulness and increase the adaptability of the invention, provided such variations constitute no departure from the salient features or the scope of the appended claims.

Having now described my invention, what I claim as new and desire to secure by Letters Patent is:

1. A fill box for connection with a pipe leading to a storage tank, comprising a hollow body formed with an internal web transversely arranged and spaced below its upper end, the web having a central threaded opening, a filler tube threaded within said opening and projecting above and below said web, the tube being in spaced relation to the body to define an annular air space, the web having a series of openings constituting air escape means, in combination with a cap fitting within and closing the upper end of the body and having a depending internally threaded flange screwed upon the filler tube, the cap further having a depending central projection, the upper end of the body being enlarged and recessed to receive the cap, a gasket within the recess engaged by the cap, and a second gasket located between said flange and projection seating upon the top edge of the filler tube.

2. A fill box for connection with a pipe leading to a storage tank, comprising a hollow body formed with an internal web transversely arranged and spaced below its upper end, the web having a central opening, a filler tube secured within said opening, in combination with a cap having a depending projection extending within said filler tube and further having a depending internally threaded flange screwed upon the filler tube, the cap having a pair of relatively eccentric recesses therein defining a socket for engagement of a turning tool therein.

3. In a fill box for mounting upon a pipe leading to a liquid storage tank, a body formed internally with a transverse web, an axially arranged filler tube extending through the web, means for simultaneously closing and sealing the body and tube, a lock device bodily removably mounted within the filler tube for obstructing the same, means for supporting the lock device, the lock device including a retractible bolt, and retaining means within the filler tube coacting with said bolt.

4. In a fill box of the character described, a body member, a filler tube mounted coaxially thereof, single means for closing both the body and the filler tube, and a bodily removable locking device mounted within the filler tube for preventing access therethrough.

5. In a fill box of the character described, a body member, a filler tube mounted coaxially thereof, single means for closing both the body and the filler tube, and a bodily removable locking device mounted within the filler tube for preventing access therethrough, the filler tube being provided internally with a flange constituting a seat and being further provided with a lip, the locking device including a casing normally resting upon said seat and having a flat side bearing against the lip whereby to be non-rotatable, the locking device further including a key operated bolt engaging beneath the lip.

6. A fill box for connection with a pipe leading to a storage tank comprising a hollow body formed interiorly with a support, a filler tube mounted within an opening in the support, there being other openings in the support providing vent means, a cap sealing the body and tube, an obstructing member adapted to be mounted within the tube for preventing access therethrough, and means for preventing removal of the obstructing member.

7. In a fill box for connection with a pipe leading to a storage tank, a hollow body, a filler tube mounted therein, there being vent openings outwardly of the filler tube, an obstructing member adapted to be inserted within the tube for preventing access therethrough, and means for preventing rotation of said obstructing member within the tube.

8. In a tank fill box, the combination of a hollow body adapted to be mounted upon a pipe leading to a tank, a filler tube within the body spaced from the walls thereof, vent means between the filler tube and body, closure means for the body and tube, and means adapted to be locked within the intermediate portion of the tube for obstructing passage therethrough.

9. A fill box for mounting upon a pipe leading to a storage tank, comprising a hollow body having an open upper end provided with an annular recess at the opening defining a seat, the peripheral wall of the recess having a groove therein, a gasket engaged upon the seat and having its outer periphery engaged within said groove, a filler tube secured axially within the body with its upper end terminating short of the upper end of the body, and a single circular cap for closing the body and tube, said cap fitting flush within the recess and upon said gasket, the cap having a depending flange having threaded engagement with the exterior of the filler tube, the peripheral wall of the flange having a groove therein, and a gasket on the underside of the cap engaged within said groove and adapted to be compressingly engaged with the upper end of the filler tube.

10. A fill box structure for tanks, comprising a pipe, a hollow body mounted thereon, a filler tube extending axially within the body and secured thereto, the filler tube terminating short of the upper end of the body, a cap for simultaneously closing and sealing the body and the filler tube, the cap including a portion having means engageable with the filler tube for effecting sealing with respect thereto and to the body, the body having a seat engageable by the cap, and gasket means anchored upon the cap and engageable with the seat and the upper end of the filler tube for making air tight connections, the anchoring of the gasket means preventing separation thereof from the cap when the latter is detached from the body and tube.

11. A tank fill box adapted to be embedded in the ground flush therewith at a location where it may be subjected to the strain of the passage of the wheels of heavy vehicles, or any equivalent, thereover, comprising a relatively rugged hollow body having upper and lower ends and adapted to receive a pipe connected at its lower end, a filler tube mounted within the body and having its upper portion arranged in spaced relation to the inner wall of the body, and a single closure having means for closing the box and means for closing the tube.

12. A tank fill box adapted to be embedded in the ground flush therewith at a location where it may be subjected to the strain of the passage of the wheels of heavy vehicles, or any equivalent, thereover, comprising a relatively rugged hollow body having upper and lower ends and adapted to receive a pipe connected at its lower end, a filler tube mounted within the body and having its upper portion arranged in spaced relation to the inner wall of the body, and a single closure cap having seating engagement with the body of the box and having sealing engagement with the tube.

13. A tank fill box adapted to be embedded in the ground flush therewith at a location where it may be subjected to the strain of the passage of the wheels of heavy vehicles thereover, comprising a relatively rugged hollow body having inlet and outlet ends, a pipe connected with the outlet end and adapted to lead to an underground storage tank, a filler tube enclosed within and protected by the body, the filler tube having a portion spaced from the inner wall of the body to form an annular chamber, and a closure common to the body and tube and having seating engagement with the former and sealing engagement with the latter.

14. A tank fill box adapted to be embedded in the ground flush therewith at a location where it may be subjected to the strain of the passage of the wheels of heavy vehicles thereover, comprising a relatively rugged hollow body having inlet and outlet ends, a pipe connected with the outlet end and adapted to lead to an underground storage tank, a filler tube enclosed within and protected by the body, the filler tube having a portion spaced from the inner wall of the body to form an annular chamber, a closure common to the body and tube and having seating engagement with the former and sealing engagement with the latter, the body being recessed to receive the closure, and said filler tube acting to support the closure at its center.

15. A tank fill box adapted to be embedded in the ground flush therewith at a location where it may be subjected to the strain of the passage of the wheels of heavy vehicles, or any equivalent, thereover, comprising a relatively rugged hollow body having upper and lower ends and adapted to receive a pipe connected at its lower end, a filler tube mounted within the body and having its upper portion arranged in spaced relation to the inner wall of the body, and a screw cap forming a closure for the body to exclude foreign matter therefrom and having a portion engaging the filler tube and preventing escape therethrough of fumes rising from the tank.

In testimony whereof I affix my signature.

JAMES B. HOLTSON.